US007080514B2

(12) United States Patent
Bland et al.

(10) Patent No.: US 7,080,514 B2

(45) Date of Patent: Jul. 25, 2006

(54) HIGH FREQUENCY DYNAMICS RESONATOR ASSEMBLY

(75) Inventors: Robert Bland, Oviedo, FL (US); William Ryan, Oviedo, FL (US)

(73) Assignee: Siemens Power Generation,Inc., Orlando, FL (US)

( * ) Notice: Subject to any disclaimer, the term of this patent is extended or adjusted under 35 U.S.C. 154(b) by 134 days.

(21) Appl. No.: 10/644,563

(22) Filed: Aug. 15, 2003

(65) Prior Publication Data

US 2005/0034918 A1 Feb. 17, 2005

(51) Int. Cl.
*F02C 7/24* (2006.01)

(52) U.S. Cl. ........................ 60/725; 181/213; 181/220

(58) Field of Classification Search .................. 60/725, 60/759, 754, 755, 756, 757; 431/114; 181/213, 181/220
See application file for complete search history.

(56) References Cited

U.S. PATENT DOCUMENTS 3,169,367 A * 2/1965 Hussey ........................ 60/754
3,793,827 A * 2/1974 Ekstedt ........................ 60/757
4,150,732 A * 4/1979 Hoch et al. ................. 181/213
4,281,741 A 8/1981 Blaser et al.
4,747,467 A 5/1988 Lyon et al.
4,944,362 A 7/1990 Motsinger et al.
5,162,620 A 11/1992 Ross et al.
5,353,598 A 10/1994 Huck et al.
5,589,242 A 12/1996 Stief et al.
6,018,950 A * 2/2000 Moeller ....................... 60/752
6,033,756 A 3/2000 Handscomb
6,106,276 A * 8/2000 Sams et al. ................. 431/114
6,530,221 B1 3/2003 Sattinger et al.
6,550,574 B1 4/2003 Liu

* cited by examiner

*Primary Examiner*—Ted Kim

(57) ABSTRACT

Aspects of the invention relate to resonator assemblies for use in non-uniform flow environments. The resonator assemblies include one or more features, such as a box or a scoop, for substantially equalizing the pressure on the resonator. In the box configuration, a box is attached on top of the resonator. The box has a top plate with a plurality of openings and at least one side wall extending from the entire periphery of the top plate. A plenum is defined between the box and the resonator plate. In the scoop configuration, a scoop is attached to the top of the resonator such that the scoop substantially overhangs the resonator. The scoop includes at least one side wall extending substantially perpendicularly therefrom, except for one side without a side wall so as to provide an opening into a space defined between the scoop and the resonator.

20 Claims, 7 Drawing Sheets

HIGH FREQUENCY DYNAMICS RESONATOR ASSEMBLY

FIELD OF THE INVENTION

The invention relates in general to turbine engines and, more particularly, to resonators for suppressing acoustic energy in a turbine engine.

BACKGROUND OF THE INVENTION

Various damping devices can be used in connection with turbine engines to suppress certain undesired frequencies of dynamics including the frequency band known as screech (1000–5000 Hz). Such high frequency dynamics can result from, for example, burning rate fluctuations inside the combustor section of the turbine. Without a damping device, such frequencies can quickly destroy combustor hardware. Thus, one or more damping devices 10 can be associated with the combustor section 12 of a turbine engine, as shown in FIG. 1. One commonly used damping device 10 is a resonator.

FIGS. 2–5 show one example of a resonator 14 known as a Helmholtz resonator. Generally, the resonator 14 provides a closed cavity 16 defined by a plate 18 having a plurality of inlet openings 20 therein and at least one side wall 22 extending about the periphery of the plate 18. The plate 18 can have any of a number of configurations including substantially rectangular, oval, circular, polygonal or combinations thereof. In addition, the resonator plate 18 can be flat or it can be curved.

The side wall 22 can be formed from a single continuous piece with the resonator plate 18 or it can be made of one or more separate side walls. For example, when the plate 18 is rectangular, there can be four side walls 22 extending from each side of the plate 18. In such case, the side walls 22 can be attached to the outer periphery of the plate 18 and to each other where two walls abut. The side wall 22 can extend substantially perpendicularly away from the resonator plate 18; alternatively, the side wall 22 can taper outwardly from the periphery of the resonator plate 18. The openings 20 in the resonator plate 18 can have any of a number of conformations such as circular, oval, rectangular, triangular, and polygonal.

As shown in FIG. 2, one or more resonators 14 can be secured to and about the outer periphery of a combustor component 24, such as a liner or transition, in any of a number of manners including by welding or brazing. The combustor component 24 can include a plurality of openings 26 through its thickness; the resonator 14 can be attached to the component 24 such that the openings 26 in the combustor component 24 are enclosed by the resonator 14. The combustor component 24 can define one side of the closed cavity 16 of the resonator 14.

Flow can enter the resonator 14 through the openings 20 in the resonator plate 18. The flow can then be reacted by the volumetric stiffness of the closed cavity 16, producing a resonance in the velocity of the flow through the holes 20. This flow oscillation has a well-defined natural frequency and provides an effective mechanism for absorbing acoustic energy. Further, the flow entering the resonator 14 can be used to impingement cool the surface of the combustor component 24, before the flow exits through the holes 26 in the component 24. In addition to the above example, additional resonator configurations are disclosed in U.S. Pat. No. 6,530,221 B1 ("the '221 patent"), which is incorporated herein by reference. The '221 patent discusses the basic resonator operation in greater detail.

Existing resonator design techniques assume a fixed pressure drop across the resonator 14 from the outer side 28 (i.e., the resonator plate 18) to the inner side 30, such as the combustor component 24 (see FIG. 4). Design parameters requiring specification include resonator volume, mass flow through the device and pressure ratio across the inner and outer walls of the resonator. Given this assumption and these parameters, a resonator 14 can be designed to provide a desired level of damping and frequency response. However, if the actual conditions vary from the assumed conditions, the resonator may not perform as designed, which in turn can detrimentally affect the performance of the combustor.

The operating environment of a turbine engine can expose resonators to heavily non-uniform flow and pressure environments. For example, the air flow entering the combustor section is non-uniform, and when this non-uniform flow is combined with the irregular geometries of the neighboring components, a complex flow pressure field develops. Further, the resonators themselves can restrict flow depending on their size. Such restriction can accelerate the flow and diminish the static pressure over the resonators, which typically changes the pressure drop from the design assumption. Moreover, if such non-uniformities must be accounted for in the design, the design of the resonator can become significantly complicated.

Thus, one object according to aspects of the present invention is to provide a resonator configured to deliver a more predictable pressure field to the resonator, even in heavily non-uniform fluid flow environments, so as to allow the resonator to perform as it was designed. Another object according to aspects of the present invention is to provide a resonator configuration that can increase the pressure drop available across the resonator. Still another object according to aspects of the present invention is to provide a resonator design that can even the pressure impinging on the outer surface of the resonator. Yet another object according to aspects of the present invention is to provide a resonator design that facilitates the use of computational tools to predict pressures produced so that these pressures can be relied on in the design process. These and other objects according to aspects of the present invention are addressed below.

SUMMARY OF THE INVENTION

Aspects of the present invention relate to a resonator for a non-uniform fluid flow environment. The resonator includes a resonator portion and a scoop portion. The resonator includes a plate having a plurality of openings therein and at least one side wall extending about the periphery of the plate. The at the side wall of the resonator can extend substantially perpendicularly from the resonator plate.

The scoop has a top plate and at least one side wall extending substantially perpendicularly therefrom. The top plate of the scoop can include at least one opening. The at least one side wall of the scoop is attached to the resonator such that the scoop is disposed above the resonator plate and such that the top plate substantially overhangs the plate. The at least one side wall of the scoop can be attached to the resonator by one of welding or brazing. Further, the scoop includes one side without a side wall so as to provide an opening into a space defined between the scoop and the resonator plate. In use, the scoop can capture a passing fluid so as to substantially equalize the pressure impinging on the resonator plate.

The scoop and the top plate of the resonator can be spaced substantially equidistant. The spacing between the scoop portion and the top plate can be from about 1 millimeter to about 2 millimeters. In addition, the scoop and the resonator plate and the scoop top plate can be curved.

In one embodiment, the resonator plate can include front and rear ends. The front and rear ends can be disposed at different elevations. For example, the rear end of the resonator plate can be disposed higher than the front end. The difference in elevation between the front and rear ends can be from about 1 millimeter to about 3 millimeters. One side of the top plate of the scoop can be attached to the rear end of the resonator plate such that the opening is at the front end.

The resonator and scoop include an axial length and a circumferential length. In one embodiment, the axial length can greater than the circumferential length. In another embodiment, the axial length can greater than the circumferential length.

Other aspects of the present invention relate to a resonator for a non-uniform fluid flow environment. The resonator includes a resonator portion and a box portion. The resonator includes a plate having a plurality of openings therein and at least one side wall extending from the periphery of the plate top. The box is attached on top of the resonator. The box has a top plate and at least one side wall extending from the entire periphery of the top plate. The top plate includes a plurality of openings. The at least one side wall can extend substantially perpendicular away from the top plate. A plenum is defined between the box and the resonator plate, the plenum having a volume. In operation, a fluid entering the plurality of openings in the top plate of the box is substantially equalized in the plenum prior to impinging on the resonator plate.

The top plate of the box and the resonator plate can be substantially identical. Further, the top plate of the box and the resonator plate substantially equidistant. The side walls of the resonator can attached to a turbine engine component so as to define a volume between the component and the resonator. The plenum volume can be less than the resonator volume. The height of the box can be from about ¼ to about ⅖ the height of the resonator.

DETAILED DESCRIPTION OF EMBODIMENTS OF THE INVENTION

Aspects of the present invention address the shortcomings of prior resonator designs, particularly when such resonators are placed in non-uniform flow and pressure environments. Aspects of the present invention relate to resonators including one or more features for delivering a more predictable pressure field to the resonator and/or for more evenly distributing the pressure prior to impinging on the resonator. Such features can include a flow scoop or another box volume. Aspects of the present invention can help to bring the actual conditions experienced by the resonator more in line with assumed design considerations.

Embodiments of the invention will be explained in the context of a resonator for a turbine engine. Embodiments of the invention are shown in FIGS. 6–8, but the present invention is not limited to the illustrated structure or application. For example, the resonator configurations according to the present invention can be used an any section of the engine that may be subjected to high frequency dynamics. Further, the resonator assemblies according to aspects of the invention can have application beyond the turbine engine context such as to any non-uniform flow or pressure environment such as those having pressure gradients and/or those having irregular geometries of nearby components.

Figure 6A:
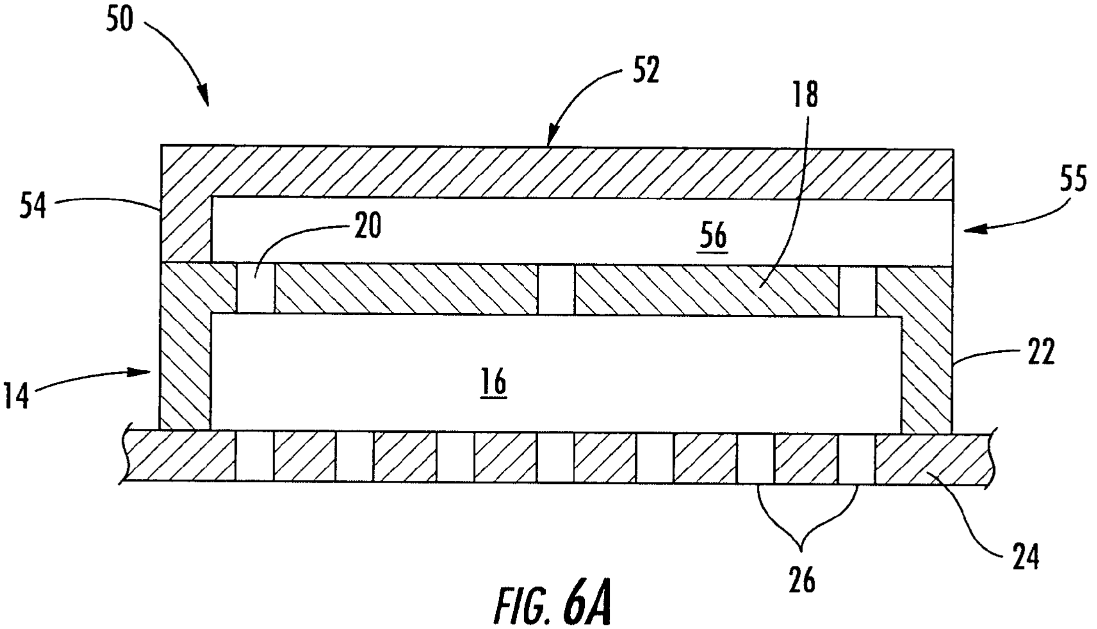
FIG. 6A is cross-sectional view of a first resonator configuration according to aspects of the present invention.
Figure 6B:
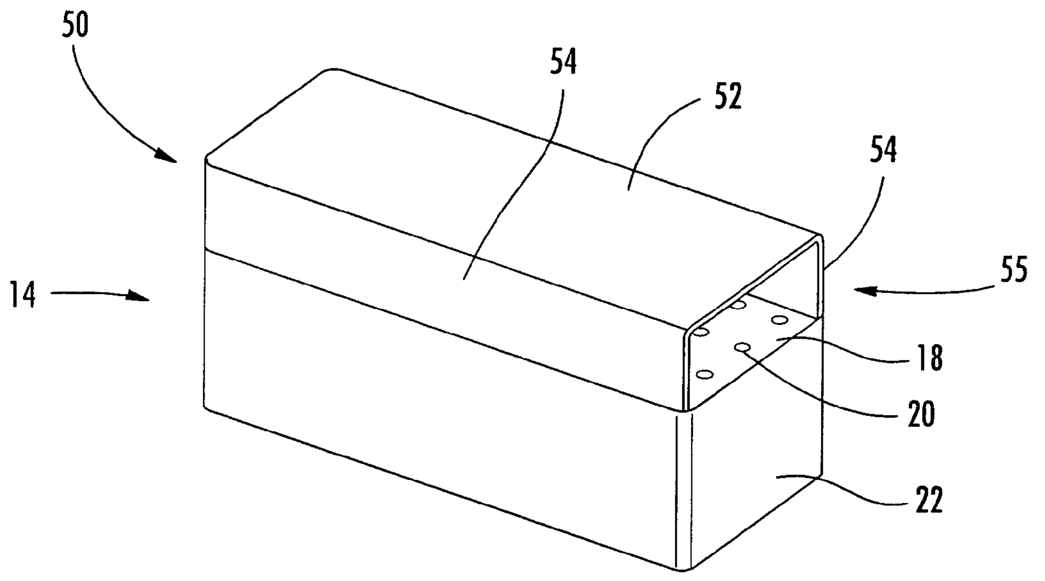
FIG. 6B is an isometric view of a first resonator configuration according to aspects of the present invention.

As shown in FIGS. 6A–6B, one resonator according to aspects of the present invention can include a scoop 50 attached to the resonator 14 by, for example, welding or brazing. The scoop 50 can include a top plate 52 and at least one side wall 54 extending substantially perpendicularly therefrom. The at least one side wall 54 of the scoop 50 can be attached to the resonator 14 such that the scoop 50 is disposed above the resonator plate 18 and such that the top plate 52 substantially overhangs the resonator plate 18. Further, the scoop 50 includes one side without a side wall so as to provide an opening 55 into a volume 56 defined between the scoop 50 and the resonator plate 18.

The scoop 50 and the resonator plate 18 can have any spatial relationship so long as flow can adequately enter the volume 56 as well as openings 20 in the resonator plate 18. For example, the scoop 50 and the resonator plate 18 can be spaced substantially equidistant from or substantially parallel to each other. Alternatively, the scoop 50 and resonator plate 18 can be disposed at varying distances with respect to each other. In one embodiment, the spacing between the scoop 50 and the resonator plate 18 can be from about 1 millimeter to about 2 millimeters.

The scoop 50 and the resonator plate 18 can be substantially identical in conformation or they can be different. In one embodiment, the scoop 50 and/or the resonator plate 18 can include at least one curve. For example, the scoop 50 and/or resonator plate 18 can be curved to generally follow the outer curve of any component to which they are attached. Alternatively, one or both of these components can be substantially flat. The scoop 50 and the resonator 14 can be made of metal such as Hast-X. The thickness of the scoop 50 and resonator 14 can be from about 0.5 millimeters to about 2 millimeters. In one embodiment, the height of the resonator 14 can be from about 10 millimeters to about 12 millimeters, and the height of the scoop can be from about 3 millimeter to about 4 millimeters. Again, these are only examples of height ranges for the resonator 14 and scoop 40. The height of the resonator 14 and/or scoop 50 may be larger or smaller than the above ranges. The sizing of the resonator can depend at least in part on the desired frequency response.

Figure 7A:
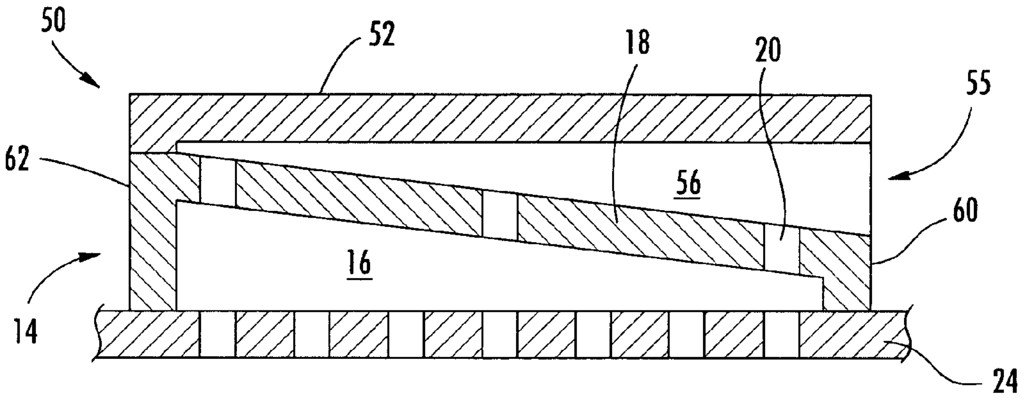
FIG. 7A is cross-sectional view of a second resonator configuration according to aspects of the present invention.
Figure 7B:
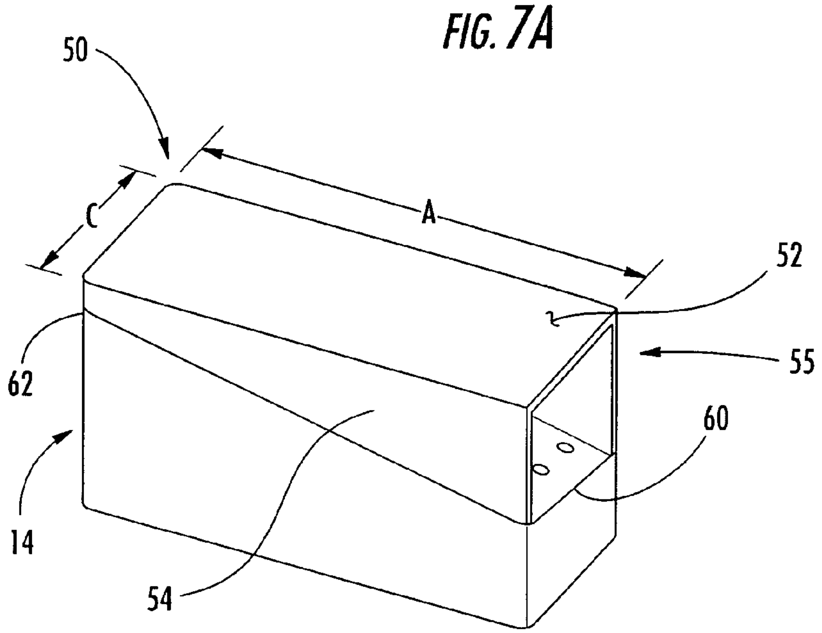
FIG. 7B is an isometric view of a second resonator configuration according to aspects of the present invention.
Figure 7C:
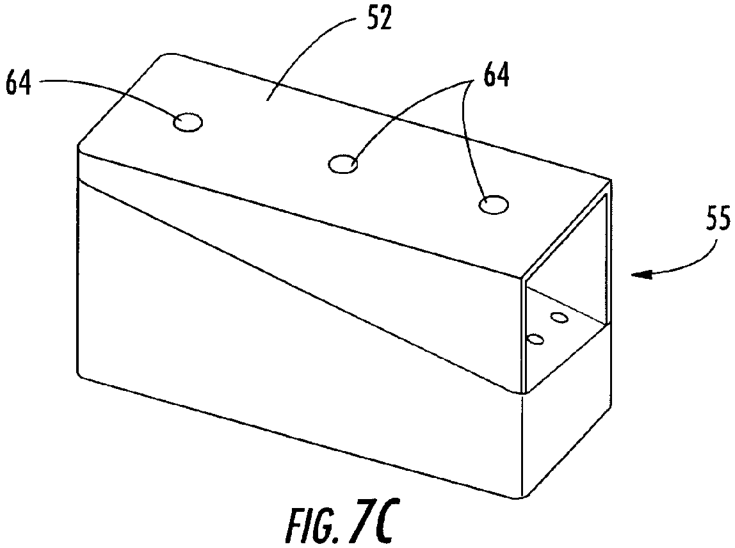
FIG. 7C is an isometric view of a third resonator configuration according to aspects of the present invention.

One possible drawback of a scoop configuration according to aspects of the invention is that it can increase the overall height of the resonator. In addition to possible structural interferences, the taller resonator may further block the oncoming flow, which can accelerate the flow and thereby increase the overall system pressure. Thus, aspects according to the present invention can relate to a resonator 14 and scoop 50 configuration having a low profile, as shown in FIGS. 7A–7C, in comparison to the resonator configuration shown in FIGS. 6A–6B.

Reference to a resonator having a low profile means that the overall height of the resonator 14 and scoop 50 configuration is reduced. Ideally, the reduced height of the resonator and scoop assembly is no taller than the original height of the resonator prior to the addition of the scoop. For example, the reduced height of the resonator and scoop assembly can be from about 10 millimeters to about 12 millimeters. One manner of reducing the height is by extending the length of the resonator 14 and scoop 50 while maintaining substantially the same volume of the closed cavity 16 of the resonator 14.

The resonator 14 and the scoop 50 have an associated axial length and a circumferential length. These terms are relative to their installation on a combustor component having a generally cylindrical conformation. The axial length of the resonator 14 and scoop 50 is measured in the direction of flow over and/or through the combustor component, generally shown by dimension A in FIG. 7B. The opening 55 into the space 56 between the scoop 50 and the resonator plate 18 opens to the oncoming flow. The circumferential length refers to the length of the resonator 14 and scoop 50 about the periphery of the combustor component to which they are attached, generally shown by dimension C. Thus, aspects of the invention can alleviate issues associated with the height of the resonator, but this is at the expense of making the resonator axially or circumferentially longer. However, an increase in the axial or circumferential length of the resonator generally does not pose significant problems in the context of turbine engines.

The resonator plate includes front and rear ends 60,62. In order to create the slimmer profile, the front and rear ends 60,62 can be disposed at different elevations. The difference in elevation between the front and rear ends 60,62 can range from about 1 millimeter to about 3 millimeters. With such a configuration, the resonator plate 18 is no longer substantially equidistant from the scoop 50. However, the spacing between the resonator plate 18 and the scoop 50 must be enough such that flow into the resonator, and into the openings 20, is not overly restricted.

In one embodiment, the rear end 62 of the resonator plate 18 can be disposed higher than the front end 60 of the resonator plate 18 as is shown in FIGS. 7A–7C. In another embodiment, the front end 60 of the resonator plate 18 can be disposed higher than the rear end of the resonator plate 18.

Aspects of the present invention further relate to making any of the above scoop-type resonators tunable by including one or more openings 64 in the scoop 50, as shown in FIG. 7C. Such a design may be desirable in cases where a different pressure ratio across the resonator 14 is desired. Thus, by adding one or more openings 64 in the scoop 50 such as in the top plate 52, a portion of the pressure captured by the scoop 50 can be relieved. The quantity and/or size of the openings 64 can determine the amount of relief. The one or more openings 64 can be arranged according to a specific pattern or to no particular pattern at all. In one embodiment, the openings 64 can be substantially identical in conformation and location to the openings 20 in the resonator plate 18. Alternatively, the openings 64 in the scoop 50 can be located and sized differently from the openings 20 in the resonator plate 18.

The openings 64 can have any of a number of configurations such as circular, oval, rectangular, or polygonal. The openings 64 can be added by any of a variety of processes such as by drilling. Depending on the exact location of the openings 64, a small axial gradient may be imposed on the opening, but this axial gradient would be much smaller than the gradient on the resonator plate 18 if no scoop 50 were in place.

Having described various embodiments according to aspects of the present invention, one manner of making the resonator 14 with a scoop 50 will be described. The resonator 14 itself can be made in a number of ways. For example, the resonator can be formed out of a single sheet of metal such as by hydroforming. Alternatively, the resonator can include two or more subcomponents, such as the plate and the wall, that are secured together by, for example, welding or brazing. Openings 20 can be added to the resonator plate 18, as needed, by drilling, punching or other process.

The scoop 50 can be made in any of a number of ways. For example, the scoop can be made from the above-described resonator part or at least formed from the same die. In such case, one end of the resonator would be removed so as to provide the opening 55 into the space 56. In addition, the height of the side walls would need to be reduced to the desired level. One or more openings can be added in the top plate 52 of the scoop 50 by, for example, drilling, punching, EDM, ECM, or waterjet cut. Alternatively, the scoop 50 can be an assembly of several individual parts such as a top plate 52 and one or more side walls 54, joined by brazing or welding. Once formed, the scoop 50 can be secured to the resonator. For example, the at least one side wall 54 of the scoop can be attached to the resonator by welding or brazing.

Figure 1:
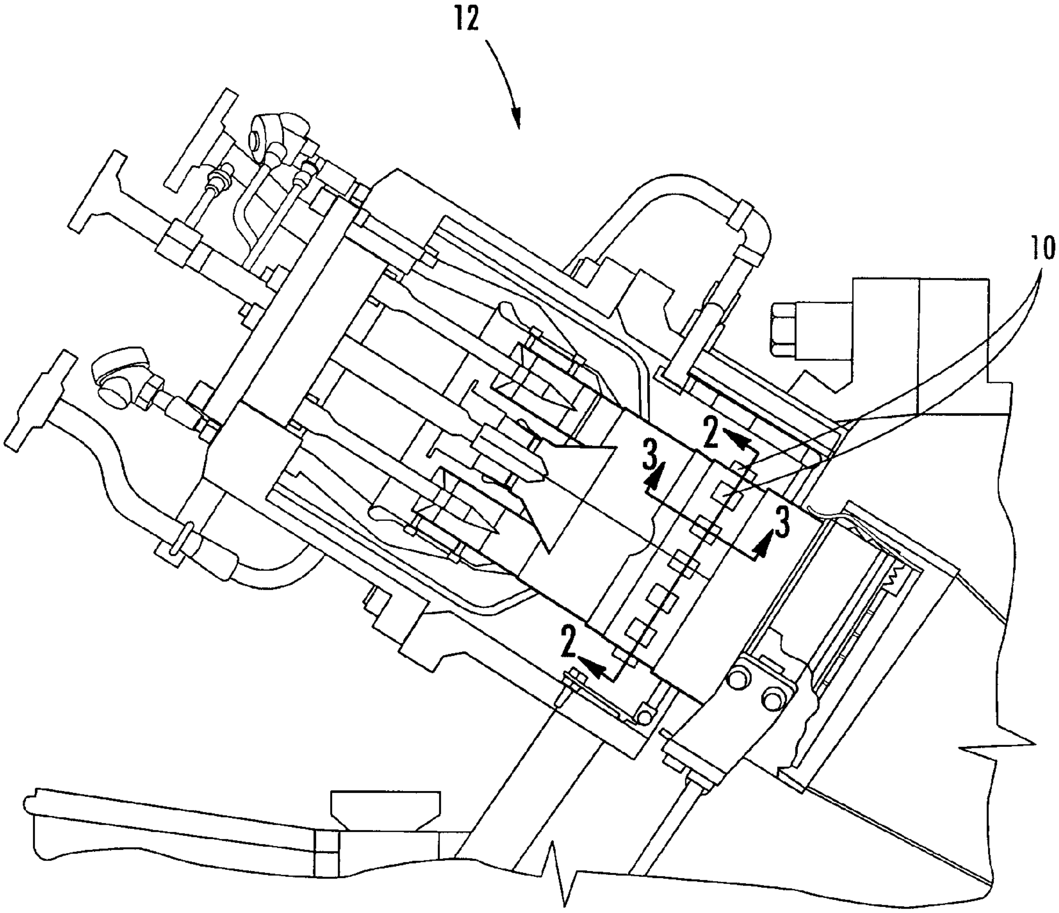
FIG. 1 is a cross-sectional view of a combustor section of a turbine engine showing a plurality of resonators disposed about the periphery of a combustor component.
Figure 2:
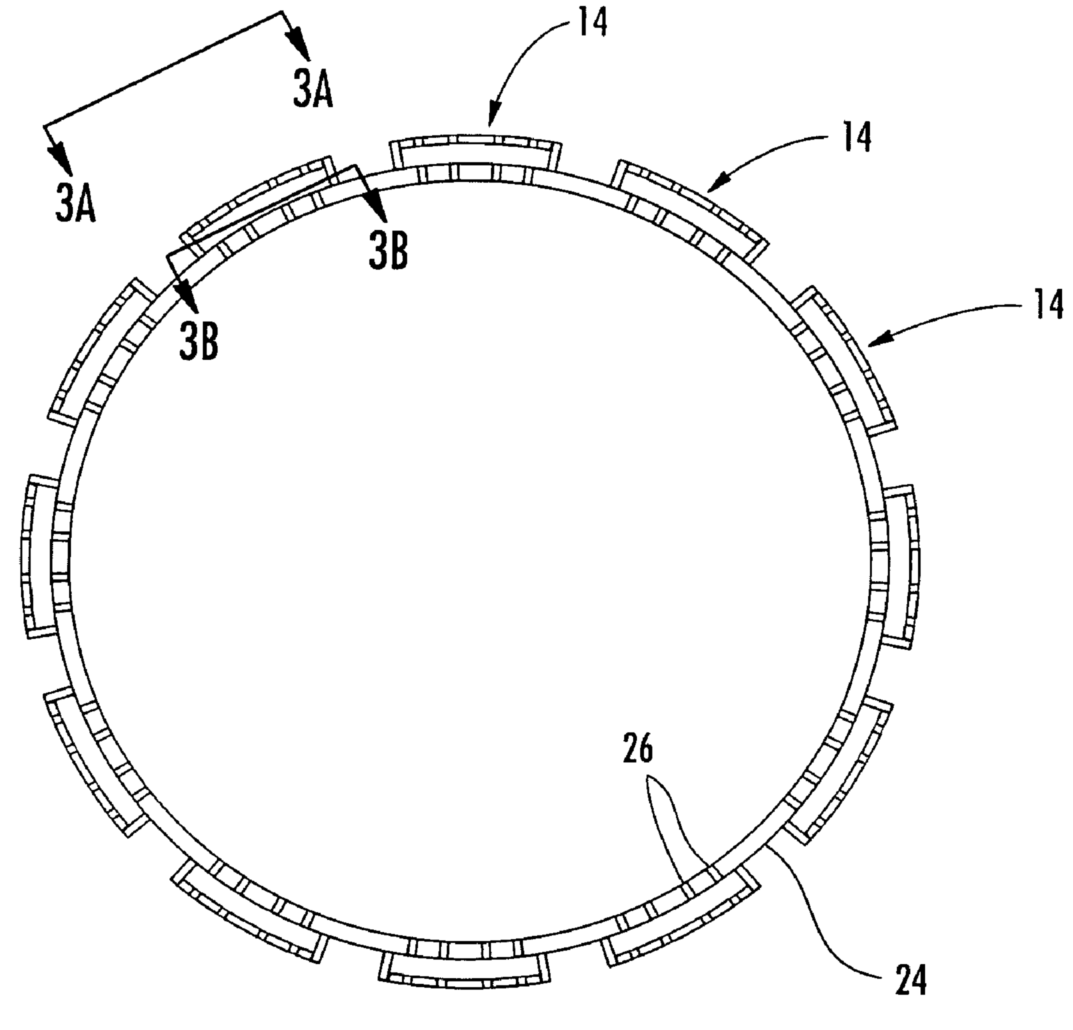
FIG. 2 (PRIOR ART)
FIG. 2 is a cross-sectional view of a combustor component having a plurality of resonators thereon, taken along line 2—2 of FIG. 1.
Figure 3A:
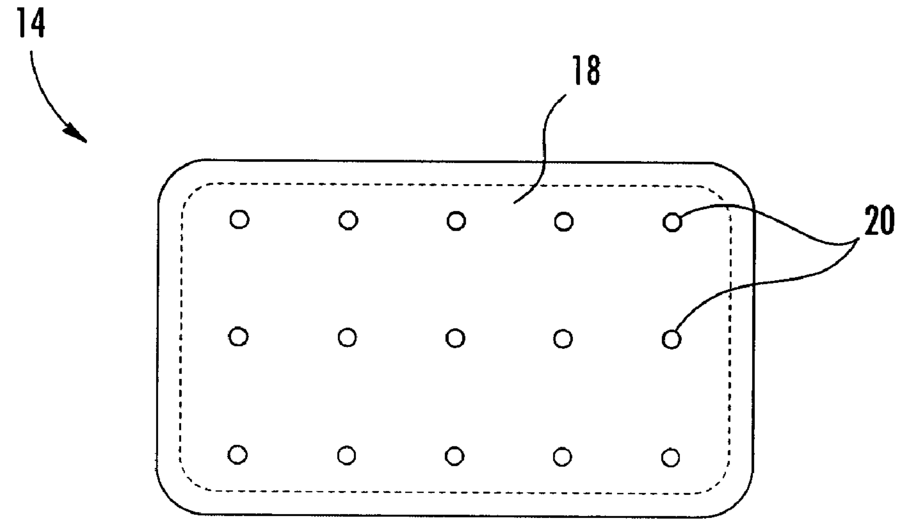
FIG. 3A (PRIOR ART)
FIG. 3A is a plan view of a prior resonator design, taken along line 3A—3A of FIG. 2.
Figure 3B:
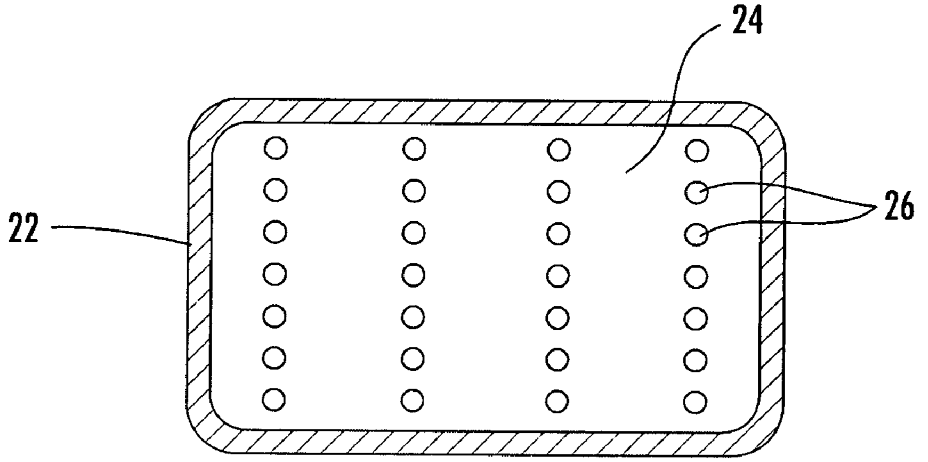
FIG. 3B (PRIOR ART)
FIG. 3B is a cross-sectional view of a prior resonator design, taken along line 3B—3B of FIG. 2.
Figure 4:
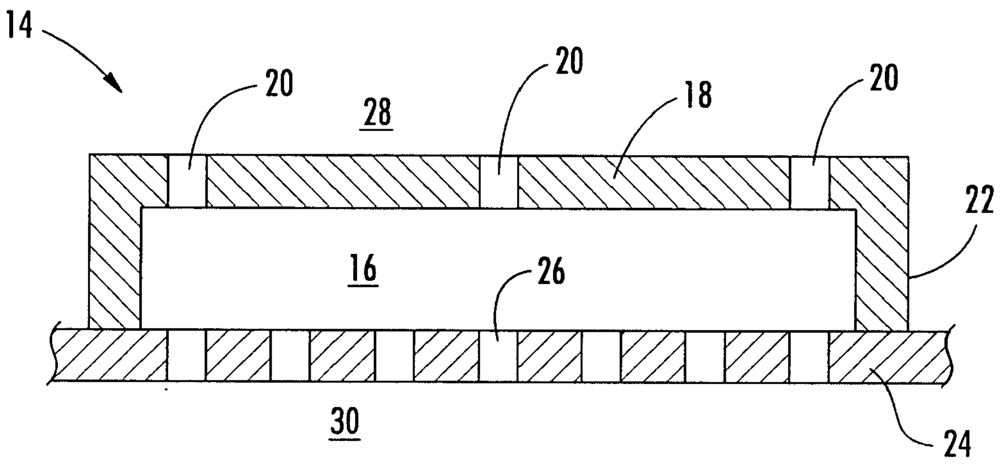
FIG. 4 (PRIOR ART)
FIG. 4 is a cross-sectional view of a prior resonator design, taken along line 4—4 of FIG. 1.
Figure 5:
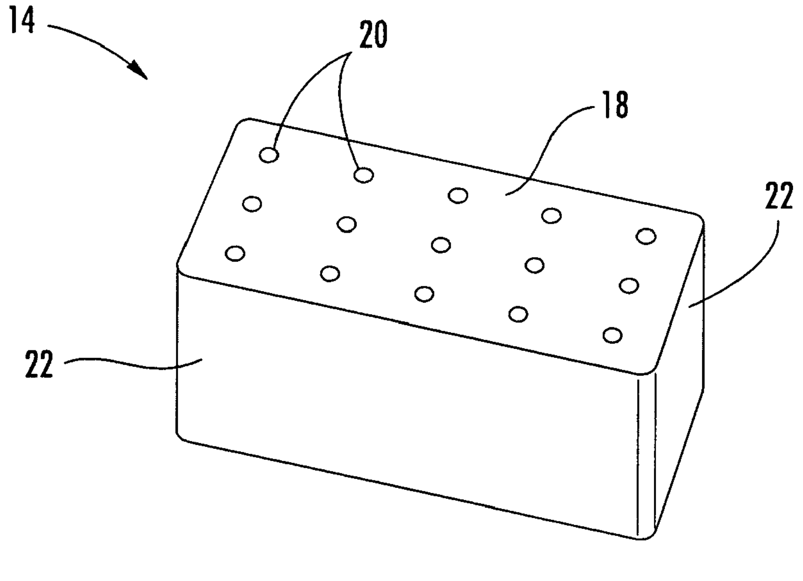
FIG. 5 (PRIOR ART)
FIG. 5 is an isometric view of a prior resonator design.

The resonator 14 and scoop 50 assembly can be attached to a combustor component 24, such as the liner or transition, by welding or brazing. Further, the scoop 50 may be retrofitted to resonators presently installed on a turbine engine. One or more resonators according to aspects of the invention can be spaced about the circumference of the combustor component 24, as shown in FIG. 2. While illustrating a prior resonator design, FIG. 2 nevertheless is instructive in that it shows the general arrangement of the resonators about the turbine engine component 24. The resonators can be spaced substantially evenly about the periphery of the component 24; however, unequal spacing can be employed as well, such as when substantially equal spacing would create interferences with neighboring structure.

Having described various manner for making a resonator assembly according to aspects to the invention, one manner in which the resonator assemblies can be used will now be described. A passing fluid, such as compressed air, flows into the space 56 between the scoop 50 and the resonator plate 18 through opening 55, which is positioned to face the oncoming flow. The scoop 50 stagnates the flow near the resonator 14 and scoop 50 assembly. For the air that enters the scoop 50, the velocity energy of the fluid is converted to static pressure. In other words, the dynamic head of the fluid flow is recovered. Thus, the scoop 50 can increase the pressure on the resonator, allowing for a greater pressure drop across the resonator 14 and, thus, more design freedom. In addition, the scoop 50 can even the pressure across the top surface 18 of the resonator, which in turn simplifies the design of the device and make its performance more predictable. The flow then enters the volume 16 of the resonator 14 through openings 20 in which the flow is resonated and the acoustic energy absorbed.

Figure 8A:
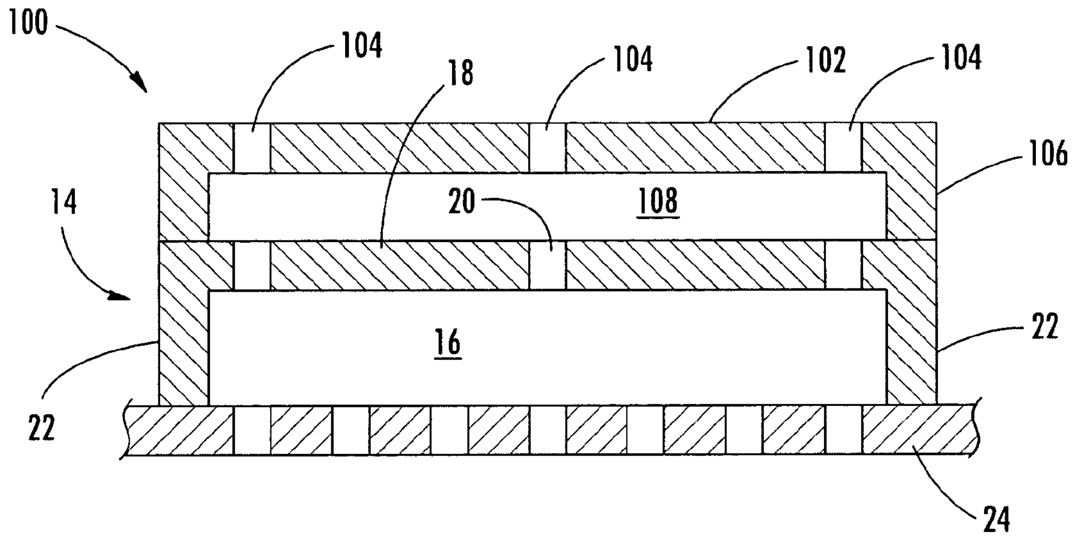
FIG. 8A is cross-sectional view of a fourth resonator configuration according to aspects of the present invention.
Figure 8B:
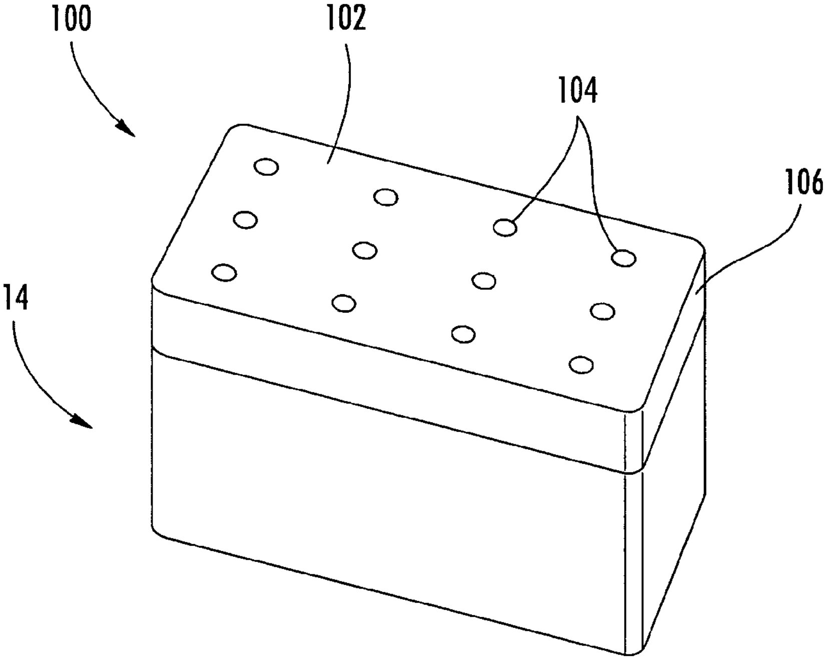
FIG. 8B is an isometric view of a fourth resonator configuration according to aspects of the present invention.

Another embodiment of a resonator configuration according to aspects of the present invention is shown in FIGS. 8A–8B. In this embodiment, a box 100 can be attached on top of the resonator 14. The details of the resonator 14 discussed above apply equally to this embodiment according to aspects of the invention. The box 14 can include a top plate 102 having a plurality of openings 104 therein. The box 100 can further include at least one side wall 106 extending about the entire periphery of the top plate 102. The side wall 106 can be a single continuous wall or it can be multiple individual walls joined to the top plate 102 and to each other. A plenum 108 having an associated volume can be defined in the space between the box 100 and the resonator plate 102.

Preferably, the top plate 102 of the box 100 and the resonator plate 18 can be substantially identical in conformation. Further, the size and pattern of the openings 104 in the top plate 102 can, but need not, be substantially identical to the openings 20 in the resonator plate 18. In one embodiment, the top plate 102 of the box 100 is substantially equidistant from the resonator plate 18. As noted earlier, the at least one side wall 22 of the resonator 14 can be attached to a turbine engine component 24 so as to define a volume 16 therebetween. The volume of the box plenum 108 can be substantially equal or different from the resonator volume 16. In one embodiment the volume of the box plenum 108 is less than the resonator volume 16.

The height of the box 100 can be from about ¼ to about ⅖ and, more particularly, from about ¼ to about ⅓ the height of the resonator. The additional height on top of the resonator 14 will block flow, which, as discussed above, can cause a decrease in the pressure acting on the resonator. Further, such an arrangement will not recover the dynamic head of the passing fluid; rather, this configuration minimizes the pressure gradient along the resonator plate 18. In this configuration, the pressure gradient will act on the top plate 102 of the box 100 instead of on the resonator plate 18. After passing through the openings 104 in the top plate 102, the flow enters the box plenum 108 where the pressure can substantially equalize prior to impinging on the resonator plate 18 such that a substantially even pressure distribution is supplied to the resonator 14.

The box-type resonator assembly can be made in various manners. The previous discussion regarding making the resonator 14 applies equally here. In one embodiment, the box 100 can be created by forming, such as hydroforming, a flat sheet of metal in a die. Preferably, the box 100 is substantially identical to the resonator 14 except for the relative heights of the two components. In such case, the same die that can be used to form resonator 14 can also be used to form the box 100. Of course, the height of the box 100 will have to be reduced in a subsequent cutting operation.

In general, the above-described scoop and box resonator assemblies will not ensure that the pressure drop is uniform across all of the resonators. Rather, the resonator assemblies increase the pressure drop available and/or make the pressure on the resonator plate 18 substantially equal for each individual resonator.

It will of course be understood that the invention is not limited to the specific details described herein, which are given by way of example only, and that various modifications and alterations are possible within the scope of the invention as defined in the following claims.

What is claimed is:

1. A resonator assembly comprising:

a turbine engine component having a plurality of opening therein;

a resonator body including a plate having a plurality of openings therein and at least one side wall extending from and about the entire periphery of the plate, the at least one side wall being attached to the turbine engine component such that the resonator body encloses at least some of the plurality of openings in the turbine engine component, wherein a cavity is defined between the turbine engine component and the resonator body; and a scoop including a top plate and at least one side wall extending substantially perpendicularly therefrom, the at least one side wall of the scoop attached to the resonator body such that the scoop is disposed above the resonator and such that the top plate substantially overhangs the plate;

wherein the scoop includes one side without a side wall so as to provide an opening into a space defined between the scoop and the resonator plate;

whereby the scoop captures a passing fluid so as to substantially equalize the pressure impinging on the resonator plate.

2. The resonator assembly of claim 1 wherein the at least one side wall of the resonator extends substantially perpendicularly from the resonator plate.

3. The resonator assembly of claim 1 wherein the at least one side wall of the scoop is attached to the resonator by one of welding or brazing.

4. The resonator assembly of claim 1 wherein the top plate of the scoop and the resonator plate are spaced substantially equidistant.

5. The resonator assembly of claim 1 wherein the top plate of the scoop and the resonator plate are curved.

6. The resonator assembly of claim 1 wherein the spacing between the top plate of the scoop and the resonator plate is from about 1 millimeter to about 2 millimeters.

7. The resonator assembly of claim 1 wherein the resonator plate includes front and rear ends, the front and rear ends being disposed at different elevations.

8. The resonator assembly of claim 7 wherein the difference in elevation between the front and rear ends is from about 1 millimeter to about 3 millimeters.

9. The resonator assembly of claim 7 wherein the rear end of the resonator plate is disposed higher than the front end.

10. The resonator assembly of claim 7 wherein one side of the top plate of the scoop is attached to the rear end of the resonator plate such that the opening is at the front end.

11. The resonator assembly of claim 1 wherein the resonator and scoop include an axial length and a circumferential length, wherein the axial length is greater than the circumferential length.

12. The resonator assembly of claim 1 wherein the resonator and scoop include an axial length and a circumferential length, wherein the circumferential length is greater than the axial length.

13. The resonator assembly of claim 1 wherein the top plate of the scoop includes at least one opening.

14. A resonator assembly comprising:

a turbine engine component having an outer peripheral surface, an inner peripheral surface, and a plurality of passages extending through the component from the inner peripheral surface to the outer peripheral surface, a resonator body including a substantially rectangular plate having a periphery, a plurality of openings extending through the plate, the body further including a side wall extending substantially perpendicularly away from and about the entire periphery of the top plate, wherein the side wall of the resonator body is attached to the outer peripheral surface of the component so as to enclose at least some of the plurality of passages, wherein a cavity is defined between the outer peripheral surface of the component and the resonator body; and a scoop including a substantially rectangular top plate having a periphery and a side wall extending substantially perpendicularly away from and about the top plate, wherein one side of the periphery of top plate does not have a side wall extending therefrom so that there is an opening into a space defined between the scoop and the resonator plate, wherein the side wall of the scoop is attached to the resonator body such that the scoop top plate substantially overhangs the resonator top plate resonator, wherein the space and the cavity are in fluid communication by way of the plurality of openings in the plate of the resonator body, whereby the scoop captures a passing fluid so as to substantially equalize the pressure impinging on the resonator plate.

15. The resonator assembly of claim 14 wherein the scoop top plate and the resonator plate are spaced substantially equidistant.

16. The resonator assembly of claim 14 wherein the scoop top plate and the resonator plate are circumferentially curved.

17. The resonator assembly of claim 14 wherein the spacing between the scoop top plate and the resonator plate is from about 1 millimeter to about 2 millimeters.

18. The resonator assembly of claim 14 wherein the scoop top plate includes at least one opening.

19. The resonator of claim 14 wherein the turbine engine component is a combustor component.

20. The resonator of claim 14 wherein the turbine engine component is substantially circular.

* * * * *